United States Patent

Hokari et al.

[11] Patent Number: 5,810,131
[45] Date of Patent: Sep. 22, 1998

[54] VIBRATION REDUCING METHOD

[75] Inventors: Norio Hokari; Shuji Iseki; Junichirou Sameshima; Yukio Hayashi; Ryoichi Tsuruoka; Mikio Kobayashi, all of Ebina, Japan

[73] Assignee: Fuji Xerox Co., Ltd., Tokyo, Japan

[21] Appl. No.: 726,826

[22] Filed: Oct. 8, 1996

[30] Foreign Application Priority Data

Oct. 13, 1995 [JP] Japan .................................. 7-265990

[51] Int. Cl.$^6$ ........................................................ F16F 11/00
[52] U.S. Cl. ............................................ 188/381; 399/308
[58] Field of Search ...................................... 188/105, 279, 188/378, 381, 379, 380; 399/303, 308, 89; 181/207, 208, 209

[56] References Cited

U.S. PATENT DOCUMENTS

| 2,038,603 | 4/1936 | Roche | 188/380 |
| 3,667,706 | 6/1972 | Tiberghien | 188/379 X |
| 4,736,701 | 4/1988 | Kondo et al. | 188/379 X |
| 5,374,979 | 12/1994 | Kobayashi | 399/303 |

FOREIGN PATENT DOCUMENTS

A-6-51629  2/1994  Japan .

*Primary Examiner*—Robert J. Oberleitner
*Assistant Examiner*—Pamela J. Lipka
*Attorney, Agent, or Firm*—Oliff & Berridge, PLC

[57] ABSTRACT

The method reduces vibrations generated in a contactor due to movement of the moving body by which the contactor contacts with a moving body. When a stroke of vibration of the contactor is halved at an intermediate point of an amplitude thereof, the vibrations are made different from each other in frequency between the reciprocation stroke in the forward side which corresponds to one of the halved stroke portions and the reciprocation stroke in the backward side which corresponds to the other halved stroke portion.

2 Claims, 2 Drawing Sheets

THE RUNNING DIRECTION OF THE TRANSFER BELT B

VIBRATION REDUCING METHOD

BACKGROUND OF THE INVENTION

1. Field of the Invention

The present invention relates to a vibration reducing method in which a contactor contacts with a moving body so that vibrations of the contactor due to movement of the moving body are reduced.

2. Description of the Related Art

Such a structure as shown in FIG. 3 in which a pin 51 is made to contact with a rotating roll 50, for example, in order to apply a high voltage to the roll 50 or in order to electrically ground the roll 50 is sometimes employed. In the structure of FIG. 3, the pin 51 is made to contact with the center of rotation of the roll 50 on its end surface. In the case of employing such a structure, however, it is difficult to make the pin 51 contact with the roll 50 at its center of rotation accurately. If the pin 51 contacts with the roll 50 at a position displaced from the center of rotation of the roll 50, the position of the roll 50 contacting with the pin 51 moves in rotating of the roll 50 and the movement of this contacting position makes the pin 51 vibrate because the pin 51 has rigidity which is lower than the roll 50, so that offensive foreign sounds inclusive high-frequency sounds are sometimes generated.

In order to prevent the generation of such foreign sounds, conventionally, there have been considered various methods in which a contactor of material having a small coefficient of friction with respect to a moving body is employed, a member for reducing the coefficient of friction is stuck on a contacting portion between the contactor and the moving body, a viscous or viscoelastic member is stuck on the contactor to attenuate generated vibrations in an instant, and so on.

It is necessary to use an electrically conductive material as the conductor so as to provide electrical conduction and it is necessary to employ an electrically conductive polymer so as to reduce the coefficient of friction as described above. However, there has been such a problem that the life of an electrically conductive polymer is short against friction and the price thereof is high.

Also in the case where an electrically conductive polymer which can provide electrical conduction and which has a small coefficient of friction is stuck to the contacting portion between a moving body and a conductor, the foregoing problems are generated. Moreover, also in the case of sticking a viscous or viscoelastic member on a contactor, there is a problem that it is necessary to perform special sticking work and the price of the viscous or viscoelastic member is high.

SUMMARY OF THE INVENTION

The object of the present invention is to provide a vibration reducing method in which the life of a contactor against friction is increased and which can be carried out at a low cost.

In order to achieve the foregoing object, according to the present invention, provided is a vibration reducing method in which a contactor contacts with a moving body so as to reduce vibrations generated in the contactor due to movement of the moving body, wherein when a stroke of vibration of the contactor is halved at an intermediate point of an amplitude thereof and one of the halved stroke portions is called a forward side and the other halved stroke portion is called a backward side, the vibrations are made different from each other in frequency between the reciprocation stroke in the forward side and the reciprocation stroke in the backward side.

Vibrations which are different in frequency of vibrations between the forward and backward sides are generated as described above so that the vibrations in the forward and backward sides interfere in each other so as to be attenuated at an instant. Since generation of foreign sounds can be prevented without using any electrically conductive polymer as a contactor or as a member to be applied to the contacting portion between a contactor and a moving body. Accordingly, the life against friction can be made long and the increase of cost can be avoided.

DETAILED DESCRIPTION OF THE PREFERRED EMBODIMENTS

First Embodiment

Figure 1A:
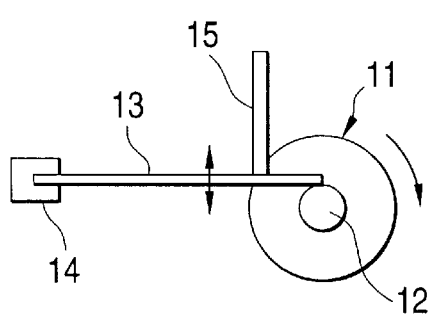
FIGS. 1A and 1B are front and side views respectively, showing a roll and a contactor for explaining a first embodiment of the vibration reducing method.
Figure 1B:
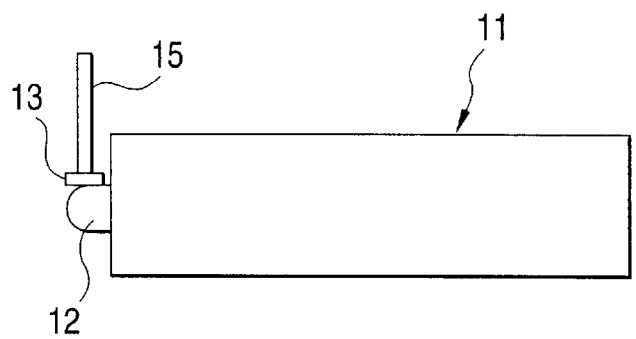

Referring to FIG. 1, description will be made under as to a first embodiment of the vibration reducing method according to the present invention.

In FIG. 1, the reference numeral 11 designates a cylindrical roll. A shaft (a moving body) 12 is passed through the roll 11 at its central portion. One end portion of the shaft 12 is formed so as to be hemispherical and projected from an end surface of the roll 11. Further, the roll 11 is supported on a supporting portion (not shown) so as to be rotatable about the center of the roll 11. A long plate-like contactor 13 is disposed substantially perpendicularly to the shaft 12 and pressed against the upper surface of the shaft 12. The contactor 13 is put such that the thicknesswise direction of the contactor 13 agrees with the radial direction of the shaft 12. The contactor 13 is fixed at its one end to a fixing portion 14 while it is made to elastically contact at its other free end with the upper surface of the shaft 12 of the roll 11.

In the first embodiment, the contactor 13 is provided for applying a bias voltage to the roll 11 or for grounding the roll 11. The main portions including the contactor 13 and the shaft 12 of the roll 11 are made of metal to obtain electrical conductivity. Here, as means for applying electrical conduction to the roll 11 as described above, there is, for example, a transfer device of an image forming apparatus in which a bias voltage is applied to a roll to generate an electric field for transferring a toner image onto paper.

A movement limit member (an interference member) 15 is immovably provided above the contactor 13 so that one end of the movement limit member 15 contacts with the contactor 13 at a longitudinally intermediate predetermined position of the contactor 13 so as to limit the upward movement of the contacting position between the contactor 13 and the shaft 12. The movement limit member 15 is formed to have such rigidity that the movement limit member 15 is not transformed by a force exerted from the contactor 13.

When the shaft 12 rotates, the contacting position between the shaft 12 and the contactor 13 successively moves up and down so that the contactor 13 vibrates in its thicknesswise direction perpendicular to the axial line of the shaft 12. In this embodiment, however, since the movement limit member 15 is provided, the contactor 13 vibrates with its fixed position at the fixing portion 14 as a fulcrum of vibrations in the forward side reciprocation stroke from a state where the contactor 13 abutting on the movement limit member 15 transforms so as to separate downward from the movement limit member 15 and then returns upward to a state where the contactor 13 abuts on the movement limit member 15 again. On the other hand, the contactor 13 vibrates with its abutting position on the movement limit member 15 as a fulcrum of vibrations in the backward side reciprocation stroke from a state where the contactor 13 abutting on the movement limit member 15 transforms upward and then returns downward to a state where the contactor 13 separates from the movement limit member 15. The fulcrum changes in position between the forward and backward side reciprocation strokes as described above so that the frequency of vibrations is different from each other between the forward and backward reciprocation strokes.

Vibrations which are different in frequency from each other between the forward and backward sides are generated as described above, and therefore the respective vibrations in the forward and backward sides interfere in each other so as to be attenuated at an instant. Since generation of foreign sounds can be prevented without using any electrically conductive polymer as the contactor 13 or as the contacting portion between the contactor 13 and the shaft 12, the life against friction can be made long and the cost can be prevented from increasing.

Particularly in the foregoing embodiment, the movement limit member 15 is provided so as to interfere in the contactor 13 when the contactor 13 vibrates in the backward side reciprocation stroke. Thus, the vibrations of the contactor 13 can be attenuated by means of a very simple structure.

Further, an adjustment mechanism for adjusting the distance between the movement limit member 15 and the contactor 13 may be provided. In the case where the contactor 13 is made to elastically contact with the end surface of the shaft 12 from the direction of the central line, on the other hand, the movement limit member 15 is arranged in the direction of vibrations which cause foreign sounds (for example, in the up/down direction).

Second Embodiment

Next, referring to FIG. 2, description will be made as to a second embodiment of the vibration reducing method according to the present invention. In the second embodiment, the present invention is applied to a paper absorption provided in an image forming apparatus so as to make paper be absorbed on, that is, fixed upon, a transfer belt. As shown in the drawing, two cylindrical rolls (movement bodies) 17 and 17 are provided side by side and in parallel to each other so that these rolls are made to contact with the transfer belt B to rotate following the transfer belt B as the transfer belt B runs. One of the rolls 17 and 17 acts as an absorption roll. The one roll 17 is made to contact with the transfer belt B which is electrically charged by a corotron C so as to have a function to make paper be absorbed onto the transfer belt B. The other roll 17 acts as a correction roll having such a function that a portion of the paper which is not absorbed onto the transferring belt B is urged against the belt B so as to be absorbed thereon.

One end portions of the respective rolls 17 and 17 are made to be hemispherical portions 18 and 18, and the positions of the hemispherical portions 18 and 18 in the longitudinal direction of the rolls 17 and 17 are made coincident with each other. That is, the positions of the hemispherical portions 18 and 18 in the longitudinal direction of the rolls 17 and 17 correspond to each other and have the same dimensions. Further, the rolls 17 and 17 are supported on supporting portions (not shown) so as to be rotatable about the respective central axial lines of the rolls 17 and 17.

A contact body 19 is provided on one side of the rolls 17 and 17. The contact body 19 is fixed at its base end to a fixing portion 20 provided in parallel to the rolls 17 and 17. A front end of the contact body 19 has a base portion 21 extending from the fixing portion 20 along the rolls 17 and 17 and has two long plate-like contactor portions (contactors) 22 and 22 which are formed so as to extend down perpendicularly from a front end of the base portion 21 toward the rolls 17 and 17 and parallelly to each other. The contactor portions 22 are made to elastically contact with the front ends of the hemi-spherical portions 18 and 18 of the rolls 17 and 17 respectively.

In the second embodiment, the contact body 19 contacts with the hemispherical portions 18 and 18 to ground the rolls 17 and 17 similarly to the contactor 13 in the first embodiment and the contact body 19 and the rolls 17 and 17 are therefore made of metal to obtain electrically conductive properties. Portions of both the contactor portions 22 and 22 of the contact body 19 which are upper than the longitudinal intermediate predetermined portions are connected to each other through a connection member 23 stuck on the contactor portions 22 and 22.

The connection member 23 is stuck in the stretched state to the contactor portions 22 and 22 which are in the not-transformed state. The connection member 23 is constituted by flexible tape so that the movement of the contactor portions 22 and 22 in the separating direction in the sticking portion is limited by the tensile force due to the stretching (that is, one of the contactor portions 22 interferes in the other contactor portion 22 through the connection member 23) since the flexible tape is not-extensible. However, the movement of the contactor portions 22 and 22 in the approaching direction can be allowed by the flexibility.

Figure 2A:
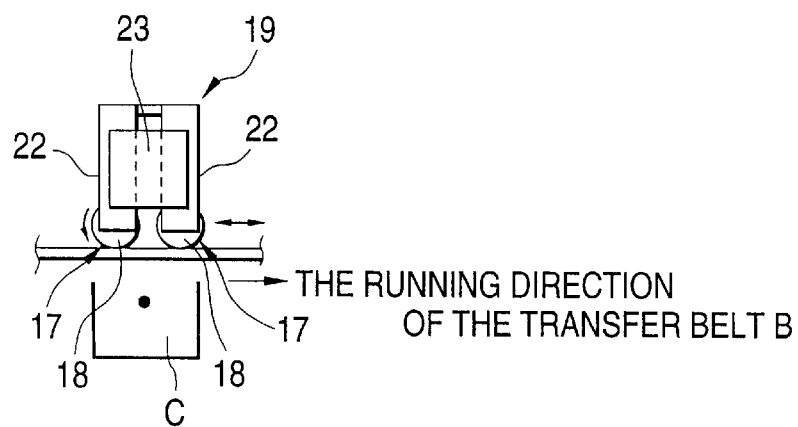
FIGS. 2A and 2B are front and side views respectively, showing rolls and contactors for explaining a second embodiment of the vibration reducing method.
Figure 2B:
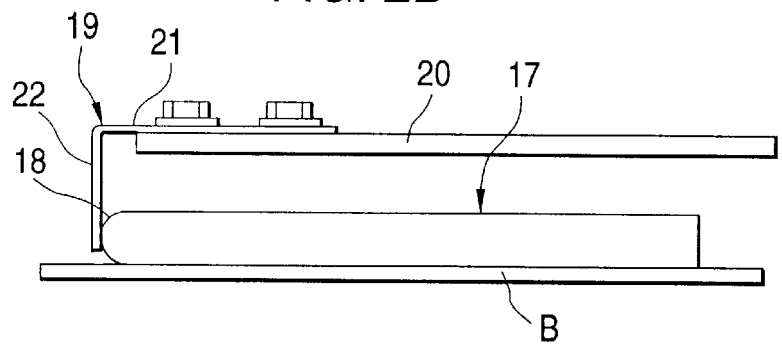
Figure 3:
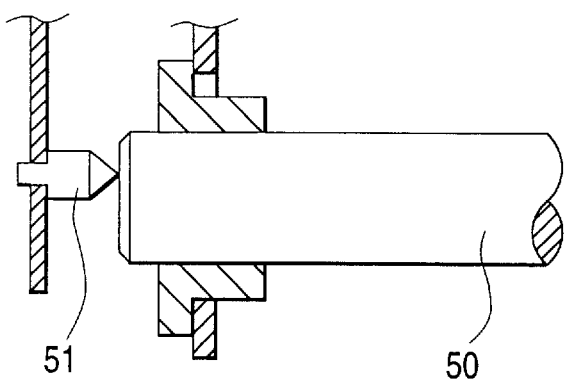
FIG. 3 is a side view showing the conventional roll and contactor.

When the transfer belt B runs to thereby rotate the rolls 17 and 17, the rolls 17 and 17 receive force in the running direction of the transfer belt B, so that they move little by little in the direction of an arrow indicated in FIG. 2A. Vibrations are generated in the contactor portions 22 and 22 with the movement of the rolls 17 and 17 and foreign sounds are generated in the contacting portion between the contactor portions 22 and 22 and the rolls 17 and 17, respectively. These foreign sounds have caused a problem.

Here, assume the case where the contactor portions 22 and 22 vibrate in the directions opposite to each other. In this embodiment, since the connection member 23 is provided, the contactor portions 22 and 22 vibrate with their connecting positions to the base portion 21 as fulcrums of vibrations in the forward side reciprocation stroke from a state where one of the contactor portions 22 moves in the direction to approach the other one so as to make the connection member 23 bent from its stretched condition to a state where one of the contactor portions 22 moves in the direction to separate from the other one till the connection member 23 is made stretched. In the backward side reciprocation stroke from a state where one of the contactor portions 22 moves in the direction to separate from the other one with the connection member 23 in its stretched condition to a state where one of the contactor portions 22 moves in the direction to approach the other one till the connection member 23 is made bent, on the other hand, vibrations of the contactor portions 22 and 22 are limited by the stretching of the connection member 23 so that the forward end sides of the contactor portions 22 where the connection member is not stuck vibrate with their end portions where the connection member is stuck as fulcrums of vibrations. Thus, the positions of the fulcrums change between the forward and backward sides reciprocation strokes as described above and therefore the frequency of vibrations is different from each other between the forward and backward sides reciprocation strokes.

Vibrations which are different in frequency from each other between the forward and backward sides are generated so that the respective vibrations in the forward and backward sides interfere in each other to be attenuated in an instant to make it possible to prevent foreign sounds from being generated. Further, the vibrations of the contactor portions 22 and 22 are spontaneously started by various conditions such as frictional force against the rolls 17 and 17, so that it is scarcely considered that the respective directions of the vibrations of the contractor portions 22 and 22 coincide with each other. When vibrations are generated in the contactor portions 22 and 22, therefore, the vibrations are attenuated in an instant by the foregoing action even in the case where the respective start timings are only slightly different from each other.

Particularly in the foregoing embodiment, it is possible to attenuate vibrations of the contactor portions 22 and 22 only by connecting the contactor portions 22 and 22 to eachother through the tape-like connection member 23. Accordingly, it is possible to prevent generation of foreign sounds by an extremely inexpensive structure.

MODIFICATION (1) The present invention can be applied also to a case where one roll and one contactor portion are provided in the second embodiment. In this case, if another member such as a bracket or the like is connected to the contactor portion through a tape-like connection member, it is possible to make the frequency of vibrations different from each other between the respective reciprocation strokes in the forward and backward sides similarly to the foregoing embodiment.

(2) In the second embodiment, the contactor portions 22 and 22 may be connected to each other through a string.

(3) Although the present invention has been described with respect to a transfer device and an absorbing device in an image forming apparatus by way of example, the present invention is not limited to that but the invention may be applied to any subject desirably. It is a matter of course that the present invention may be applied, for example, to current supply to an electrode of a heater disposed in the inside of a transfer roll, grounding of a belt driving roll, or current supply to electrode rolls arranged in opposition to each other or grounding of such electrode rolls. Further, the present invention can be applied to any apparatuses having the same structure as an image forming apparatus.

What is claimed is:

1. A vibration reducing method in which a contactor contacts with a moving body so as to reduce vibrations generated in said contactor due to movement of said moving body relative to said contactor, wherein, when a stroke of vibration of said contactor is halved at an intermediate point of an amplitude thereof, the vibrations are made different from each other in frequency between the reciprocation stroke in a forward side which corresponds to one of the halved stroke portions and the reciprocation stroke in a backward side which corresponds to the other halved stroke portion;

said vibration reducing method further comprising providing two moving bodies side by side, said method further including providing two contactors, said contactors being made to contact with said moving bodies respectively, and connecting said contactors to each other through a not-extensible flexible member.

2. A vibration reducing method in which a contactor contacts with and provides electrical contact to a moving body so as to reduce vibrations generated in said contactor due to movement of said moving body relative to said contactor, wherein, when a stroke of vibration of said contactor is halved at an intermediate point of an amplitude thereof, the vibrations are made different from each other in frequency between the reciprocation stroke in a forward side which corresponds to one of the halved stroke portions and the reciprocation stroke in a backward side which corresponds to the other halved stroke portion.

* * * * *